Nov. 2, 1937.  E. T. FERNGREN  2,097,690
TRANSPARENT CONTAINER
Original Filed Aug. 20, 1932
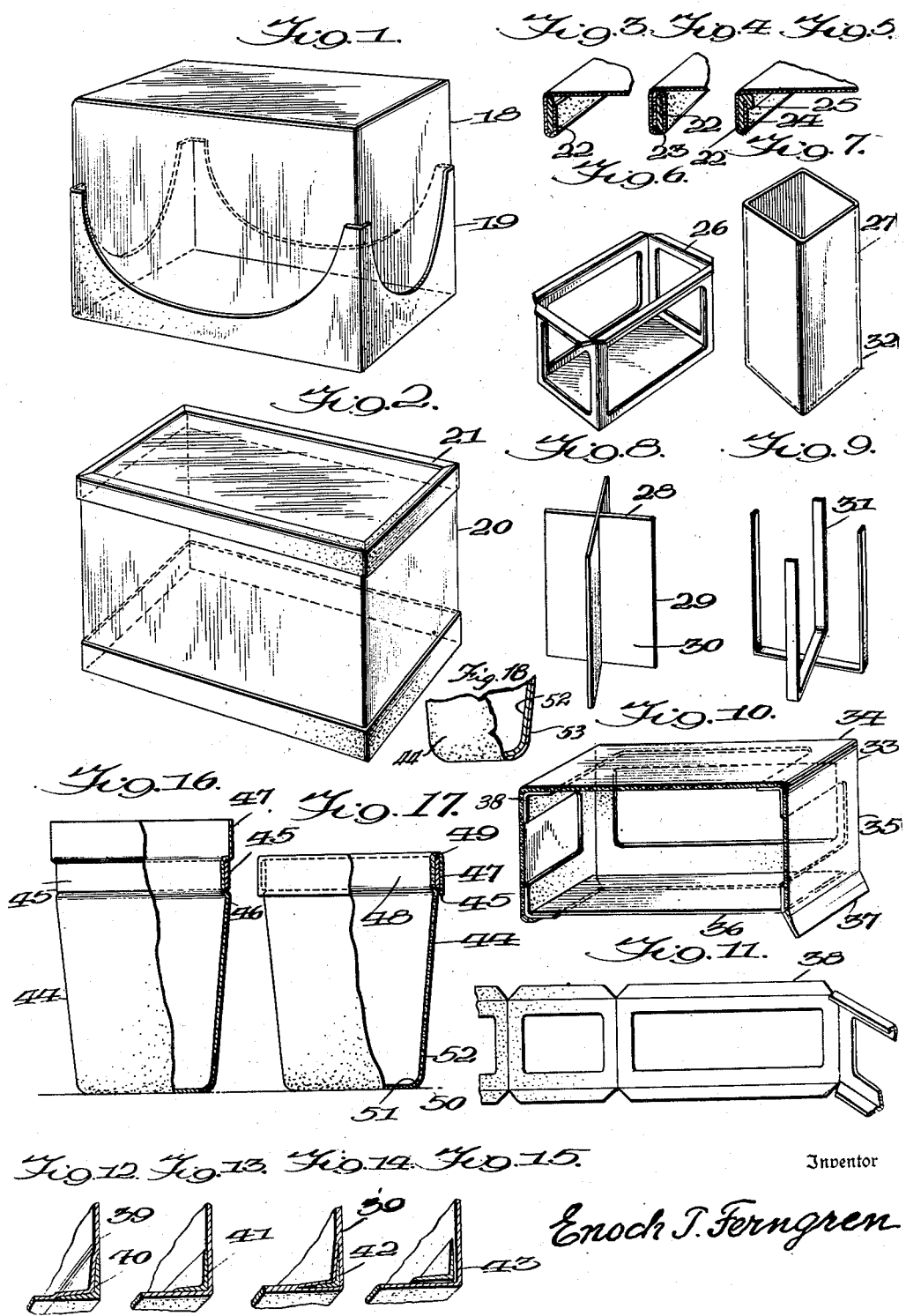
Inventor
Enoch T. Ferngren Patented Nov. 2, 1937

2,097,690

UNITED STATES PATENT OFFICE 2,097,690

TRANSPARENT CONTAINER

Enoch T. Ferngren, Jackson Heights, N. Y., assignor, by mesne assignments, to Plax Corporation, Hartford, Conn., a corporation of Delaware Application August 20, 1932, Serial No. 629,696
Renewed April 5, 1937

9 Claims. (Cl. 229—3.5)

This invention relates to containers, principally of organic plastic material, and more specifically to transparent containers which are preferably built up of two or more layers or laminations of the same or different types of organic plastic material. Such containers, according to my invention, may also be suitably reinforced at or adjacent to their corner or edge portions, if desired.

Among the objects of the invention are to provide sanitary, preferably transparent, water and air-proof, light containers or cartons, including drinking cups. Such containers may be produced from various types of cellulose derivative materials or other plastic or transparent compounds or materials which may be molded in a fluid or plastic state to produce relatively light container walls. I contemplate, for example, that as a wall or a portion of a wall of such a container, transparent sheet material such as "Cellophane" may be employed.

Different types of containers included in the scope of this invention may be formed in part at least by dipping suitable forms or molding implements into liquid plastic materials, including solutions of plastic materials to deposit a film upon the molding implement. Such containers may also be formed by folding sheeted plastic material, such as viscose tissue, around a forming tool or mandrel and thereafter applying about the article thus formed a layer or coating of the same or some other plastic material, including nitrocellulose or cellulose acetate compounds, the only limitation being that the added material must be such as to adhere to the sheeted material forming the base portion for the container.

Containers included in the scope of my present invention may also be molded by what may be termed "internal molding", which process comprises the forming of a coating from a liquid plastic material on the inside of a mold. This coating, after appropriate treatment, may then be removed to form a unitary article or to serve as a basis for an article to be built up in laminations as aforesaid. When an internal molding process and in fact some other processes of forming containers are employed, reinforcing parts may be utilized in or adjacent to the film wall being produced, thereby enabling relatively non-rigid material to be employed for many types of containers. Such containers, including boxes and drinking cups, may be produced in these or other ways at a relatively low cost and with relatively thin walls.

My invention also includes the provision of containers of bag-like or tissue-like structure, which are exposed in use to particular stresses and which by the reinforcing structures provided may be made sufficiently rigid to retain their shape during the handling and during the packing of merchandise therein. Thus, various industries may be provided with valuable and preferably transparent containers or cartons, which are superior in certain respects at least to the paper or cardboard cartons now in common use. Such transparent cartons constructed in accordance with my present invention are also superior to prior art cartons or similar containers having transparent display windows therein, as the cartons of my present invention effectively display the contained merchandise throughout their entire surface area, while at the same time protecting such merchandise from injurious influences or conditions.

As before stated, my invention contemplates the use of reinforcing members or parts wherever desirable or necessary. Such reinforcing parts may be so located that most of the contained merchandise will be exposed to view. Alternatively, the reinforcements themselves may be made transparent, thus making all the contained merchandise visible through the walls of the container.

I further contemplate that either the container itself or the reinforcing portions used therewith may serve to carry appropriate advertising matter.

I contemplate also that the reinforcing portions or parts used may be molded into the container to form an integral structure therewith, or may be applied adjacent thereto on either the inside or the outside of the container proper. Such reinforcing structures may, if desired, be secured to the container walls by interfolding or by the application of suitable adhesives.

In the drawing:

Figure 1 is a perspective view showing a transparent carton partly reinforced adjacent to its lower portion;

Fig. 2 is a similar perspective view of a carton provided with a cover and in which both carton and cover are suitably reinforced;

Figs. 3, 4 and 5 are fragmentary perspective views partly in section illustrating different ways in which the marginal edge portion at the open end of a container or a box lid may be folded about a reinforcing strip;

Fig. 6 is a perspective view of a die-cut skeleton structure adapted to be inserted in a container of generally rectangular shape;

Fig. 7 is a perspective view of a substantially rectangular transparent container into which the skeleton structure shown in Fig. 6 may be inserted;

Figs. 8 and 9 are perspective views of different types of reinforcing parts usable in connection with the container shown in Fig. 7;

Fig. 10 is a perspective view with parts in section, of a substantially rectangular container having a transparent reinforcing frame work;

Fig. 11 is a fragmentary perspective view of a die-cut reinforcing skeleton usable in connection with the container illustrated in Fig. 10;

Figs. 12, 13, 14 and 15 are fragmentary perspective views partly in section illustrating different arrangements of reinforcing parts used in conjunction with a film-type container and showing the reinforcing member respectively on the outside (Fig. 12), and inside (Fig. 13), completely embodied in the film wall of the container (Fig. 14), and entirely separate from and inside the film wall (Fig. 15);

Fig. 16 is a view in elevation with parts broken away and in vertical section of a drinking cup provided with a reinforcing strip adjacent to its upper edge;

Fig. 17 is a view, similar to Fig. 16, illustrating a drinking cup which may be the same as that of Fig. 16 with the upper edge folded down around the reinforcing part, or may be a modified form thereof (assuming Fig. 16 is a completed object); and Fig. 18 is a fragmentary view partly in elevation and partly broken away and in vertical section of a portion of a drinking cup illustrating the laminated wall construction thereof.

There is illustrated in Fig. 1, a light weight hollow container 18, which may be formed from sheeted transparent plastic material, such as viscose tissue, by folding around a forming tool or mandrel while the sheeted material is moist or otherwise deformable, then by allowing the material to dry or rigidify on the mandrel, and thereafter by coating the inside or the outside of the material with a suitable dope, such as a cellulose derivative, for example cellulose acetate, to form a laminated carton having relatively sharp corners. This carton may then be supported in or suitably reinforced by a part 19 of suitable shape. Thus, by the use of the reinforcing part 19, the relatively weak or deformable container 18 may be adequately supported.

In Fig. 2 there is illustrated a container 20 having a reinforcing structure both at its top and at its bottom. This container may be produced in the manner described above for the container 18 of Fig. 1. Alternatively it may be manufactured by internal molding processes as above set forth. It may also be formed by press-forming transparent organic plastic material if the container is made slightly tapered to permit the stripping thereof from a forming mold. The container is provided with a lid portion 21, which may be reinforced as indicated in Figs. 3 to 5 and hereinafter to be described.

As illustrated in Fig. 3, the lower edge wall portion of a molded or otherwise formed container or lid may be folded inwardly about a reinforcing strip 22 and secured thereto by the use of a suitable adhesive applied between the inner side of the reinforcing strip and the infolded edge of the container wall.

In Fig. 4 there is illustrated a modified form of construction in which the use of adhesive materials is obviated by infolding the edge portion 23 of the sheeted film material as shown, so that it will be held in place by the reinforcing strip 22.

In Fig. 5 there is illustrated a further modification of the construction of the edge of a container or lid in which the edge portion 24 of the container or lid is folded inwardly about a reinforcing strip 22 and that strip is then doubled over against itself to grip the upper edge of the inwardly turned film wall as indicated at 25. This construction also obviates the use of adhesives.

In Fig. 6 there is illustrated a skeleton reinforcing structure 26, which may be used either on the inside or the outside of a container formed of film sheet material, or may be suitably incorporated therein so as to become in effect an integral part thereof. If the skeleton structure 26 be produced of a porous material, such as material of a fibrous or an absorptive nature, it may be intimately joined or incorporated into the walls of a container by any one of the several forming processes previously referred to. For example, dissolved or colloidal plastic material may be carried respectively by the solvents or liquid carrying vehicle directly into the micropscopic structure of the fibers or the interstices therebetween.

The skeleton structure 26 may also be used as a separate unit entirely detached from the container with which it is to be associated and as such may be used for containing butter or similar merchandise. I contemplate, however, that the skeleton structure 26 may be employed with a container of film sheet material, as indicated at 27 in Fig. 7. Such material, if used without reinforcement, would be more or less collapsible and difficult to keep open. However, by the use of such a reinforcing skeleton as shown at 26, the container 27 may be made sufficiently rigid so that it may be properly handled in mechanical packaging operations and thus provide an economical automatic packaging container.

In Fig. 8 there is illustrated a reinforcing structure 28 which may be employed with a container of the type illustrated in Fig. 7 and which will serve to maintain such a container open and in generally rectangular form. The reinforcing structure 28 when used with a container of the type shown in Fig. 7 serves to form a four-compartment container. As shown, the structure 28 of Fig. 8 is built up of a pair of intersecting partition walls 30, the edges 29 of which may be so thin as to be invisible to an observer of the package in which this reinforcing structure is employed, even assuming that package to be transparent as above set forth. Thus, the combination of the reinforcing structure 28 with the container 27 of Fig. 7 provides a multi-compartment container having pliable, transparent walls and having a substantially invisible reinforcing structure, the container as thus built up being substantially rigid as to shape. I contemplate, however, that the partitions 30 of the reinforcing structure 28 may be formed of either transparent or translucent material, as may be desired.

In Fig. 9 there is illustrated another type of reinforcing structure, which may be desirable for use in connection with a substantially rectangular container of the type shown at 27 in Fig. 7. Under some circumstances, the container 27 may be formed as above set forth with a slight taper toward its lower end 32, so that a plurality of the containers 27 may be suitably nested together. Under these circumstances, the reinforcing structure shown in Fig. 9, including a plurality of ribs 31, may be used therewith as the ribs may be of convenient shape to fit into the corners of the container, thus providing a reinforced container which is relatively rigid at the corner and bottom portions while being unsupported at its upper portions to permit the folding thereof. The upwardly extending ribs 31 should reach a point sufficiently far from the top of a flexible and pliable container of this type to permit the folding down of such upper portions for closing the container in a desired manner.

In Fig. 10 there is illustrated another embodiment of my invention, comprising a container 33 which may be formed of relatively soft and pliable transparent material having suitable reinforcing means at its corner portions 34 and 35 to provide a relatively stiff carton. The carton 33 may be closed at its bottom by the use of a transparent sheet of suitable plastic material 36, which may be held in place by folding over edge portions 37 of the sides of the container or of the reinforcement thereof upon the bottom member 36. I contemplate that a reinforcing structure 38 (Figs. 10 and 11) for use with the sheet walls of the container 33 may be transparent or of suitably colored translucent material to provide an attractive carton. The reinforcing skeleton 38 may be die cut from suitable material, including sheet fibrous material.

In Figs. 12 to 15 inclusive, there are illustrated various ways in which the corner portion of a container, the walls of which are of relatively thin flexible film or sheet material, may be reinforced by suitable reinforcing corner portions. In Fig. 12, a reinforcing member 40 is applied on the outside of the container walls 39. In Fig. 13, a reinforcing corner portion 41 is applied on the inside of the container walls. In Fig. 14 a reinforcing member 42 may be molded substantially integrally into the container walls 39. In Fig. 15 a reinforcing member 43 is entirely separate from the container walls, but may be suitably fitted or attached thereto. It will be understood, of course, that the dimensions of the parts shown in these figures have been exaggerated to illustrate clearly the relationship of the film-type walls to the reinforcing parts.

In Figs. 16 and 17 there is illustrated a container formed as a drinking cup 44. This cup may be constructed by the internal molding process described in my copending application, Serial No. 586,184, filed Jan. 12, 1932, or it may be made by one or another of the processes hereinabove referred to, as by laminating, i. e., by folding sheeted plastic material about a suitable former or mandrel and thereafter by spray-coating the formed sheeted material with plastic material, or by any other desired and mechanically feasible process by which light film-type structures may be made. As shown, the cup 44 may be reinforced by the use of a reinforcing member or band 45 disposed in an annular recess 46 formed in the cup. After the reinforcing member 45 is located as aforesaid, the upper wall portion or brim 47 of the cup wall may be turned downwardly to enclose the reinforcing member as shown in Fig. 17, thereby providing a three-ply reinforcement or lip 48 for the cup having a smooth rounded edge, as shown at 49.

The bottom 50 of the cup 44 may be molded flat and provided with rounded corners, as shown at 51, Fig. 17. If the radius of the rounded edge or corner at 51 is increased, greater strength will be imparted to this portion of the cup. I further contemplate that if desired suitable reinforcement of this portion of the cup may be employed, as is taught, for example, elsewhere in the present disclosure.

The reinforcement 45 may carry suitable advertising material printed or otherwise applied thereto.

In Fig. 18 there is illustrated in detail a portion of the cup 44 and showing it built up of a main body portion 52 which may be made as above set forth of suitable sheeted material formed about a mold or mandrel and on the outside of which is applied a film-coating 53 of plastic material.

It will be apparent that many other types of containers for different commodities may be made of light weight transparent tissues or sheeted material having reinforcements at their edge portions or corners, or by folding border portions of the sheeted material at the edges to reinforce the edge portions of the finished container and prevent tearing, and also by adhesively joining thin, transparent or opaque reinforcing strips to the relatively weak sheeted material at the edges or corners thereof.

If the drinking cup 44 shown in Figs. 16 to 18 be formed with a body portion of "Cellophane" or light cellulose xanthate sheet material by folding on a mandrel, the strip used for reinforcing purposes and also to carry advertising matter may be assembled to the border zone of the cup at the time the sheet material is being shaped on the forming tool. Also, a press-formed bottom portion is preferably used, such portion being suitably secured to the forming tool before the sheet material is wrapped therearound.

After the cup has been assembled as set forth, a thin transparent coating 53 (Fig. 18) may be applied to the side wall 52 thereof, such coating being composed of any suitable material which will adhere to the basic wall structure to reinforce and bind the portions of the cup into a complete seamless article.

A drinking cup formed in accordance with my present invention as above set forth has greater strength and durability than the paper drinking cups now in common use and may be washed and used many times, the material lending itself to this economical re-use due to its waterproof characteristics and to the fact that it is not affected by either hot or cold drinks.

While a cup constructed in accordance with the present invention may be somewhat more expensive to produce than the well-known paraffin paper cups, it will be more economical in the long run, as it need not be thrown away after once using it. It also may be made in a form and appearance acceptable to the users.

The reinforcing of the edge of the cup or at the bottom thereof enables it to be constructed with a minimum of the plastic material, thereby reducing manufacturing costs and enabling the cup to be produced on a commercially economical basis and thus available to the public at a relatively low cost. This cup is also advantageous in that the materials of which it is produced render it sanitary.

Many types of merchandise, such as butter, lard, ice cream, cheese, soap, etc., are themselves sufficiently rigid so that they may be enclosed in a relatively flexible or pliable container and thus adapted for use with the containers of my present invention. These and other types of merchandise may be packaged by automatic machinery as well known in the art.

I further contemplate that the edges of containers or the covers thereof may be reinforced to a certain extent at least merely by folding on themselves without the use of a reinforcing strip, such as the strip 22, Figs. 3 to 5.

Many containers which require relatively stiff or rigid walls may be made as above set forth by the use of the cellulose acetate type of plastics, or by other plastics will provide relatively rigid film walls. I contemplate that with cellulose acetate or other plastics a predetermined and usually small amount of a gum or a plasticizer or both may be added to provide desired characteristics for the material. Further, as above set forth, I contemplate that the articles may be formed by dipping a former or preformed article of sheeted material in a suitable solution, disbursion or sol of suitable plastic material or may be formed by an internal molding process, also as above set forth. Furthermore, I contemplate that the plastic material used in forming the containers of my invention may be spread by mechanical action or other expedients, such, for example, as differential fluid pressure or by extrusion, and that as a result of one or more of these actions a coating may be formed on the inner surface of a mold, which when solidified may be released by mechanical or pneumatic action, or by mechanically opening the mold (when a split mold is used). Furthermore, ribs, recesses, or other shapes may be formed on or in an article within a split mold. Any solvents or other liquid vehicle may be removed from films so formed by suitable control and variation of the gaseous pressure adjacent to the films in combination with suitable temperature control.

I also contemplate that when a light walled article or container is to be produced from a hot molding plastic fluid, the mold may be heated at the time the plastic fluid is spread thereon, whether by dipping or by internal molding as aforesaid. The film formed thereby may then be coagulated or rigidified either by the temperature treatment required by the particular type of plastic material being employed or by the action of a suitable coagulating liquid which is well known in the art of working cellulose xanthate. For example, certain methods of forming hollow articles are disclosed in my copending application, Serial No. 499,771, filed December 3, 1930. Under certain conditions a detachable reinforcing structure or part should be formed of thin material, so as to prevent the building up of excessively thick border portions. Furthermore, in respect to the drinking cup 44 shown in Figs. 16 to 18, I contemplate that a reinforcing disk may be used in connection with the bottom thereof to provide increased strength and life for the cup. Other modifications may be made in the form of a cup, particularly at the edge thereof to provide a desired configuration thereto. Such a construction would have the advantage of providing additional stability to the open end of the cup.

This application is a continuation in part of my copending application, Serial No. 587,535, filed Jan. 19, 1932, which is now Patent No. 2,030,059, granted Feb. 11, 1936.

While I have shown a number of different forms in which my invention may be embodied, I contemplate that other changes may be made therein and that the principles thereof may be applied in many ways in addition to those shown and described herein. I do not wish to be limited, therefore, except by the scope of the appended claims, which are to be construed as broadly as the state of the prior art permits.

What I claim as new and desire to secure by Letters Patent is:

1. A seamless, transparent drinking cup of a waterproof material formed with a folded-over border wall at its open end to produce a rounded edge thereon, and having a recessed annular groove covered by the folded portion, and a reinforcing band in the groove.

2. A transparent, thin-walled drinking cup of waterproof material formed with a folded-over border wall at its open end, and having a reinforcing band adapted to have advertising matter printed thereon inserted within the folded portion.

3. A laminated, transparent container comprising a combination of two layers, the inner layer being composed of thin, flexible, transparent, pre-formed sheeted material of a cellulose plastic shaped into a container of predetermined form; the said inner layer being flexible and pliable but being insufficient in thickness to provide the required rigidity to the container; the outer layer being a transparent coating of a fluent material of cellulose plastic composition hardened in situ and being of sufficient thickness to provide rigidity and stiffness to the container.

4. A laminated, transparent container according to claim 3 formed as a drinking cup, having a folded-over border wall at its open end thereby producing a rounded edge thereon.

5. A laminated, transparent container according to claim 3 comprising additional reinforcement structure adapted to support particularly exposed parts of said container.

6. A laminated, transparent container according to claim 3 comprising additional transparent reinforcement structure adapted to support particularly exposed parts of said container without obstructing the visibility of its contents.

7. A laminated, transparent container according to claim 3 comprising additional reinforcement structure adapted to support the top and bottom of said container.

8. A laminated, transparent container according to claim 3 comprising additional reinforcement structure at the corners of the container.

9. A laminated, transparent container according to claim 3 comprising additional reinforcement structure at the edges of the container.

ENOCH T. FERNGREN.